Patented Dec. 4, 1951

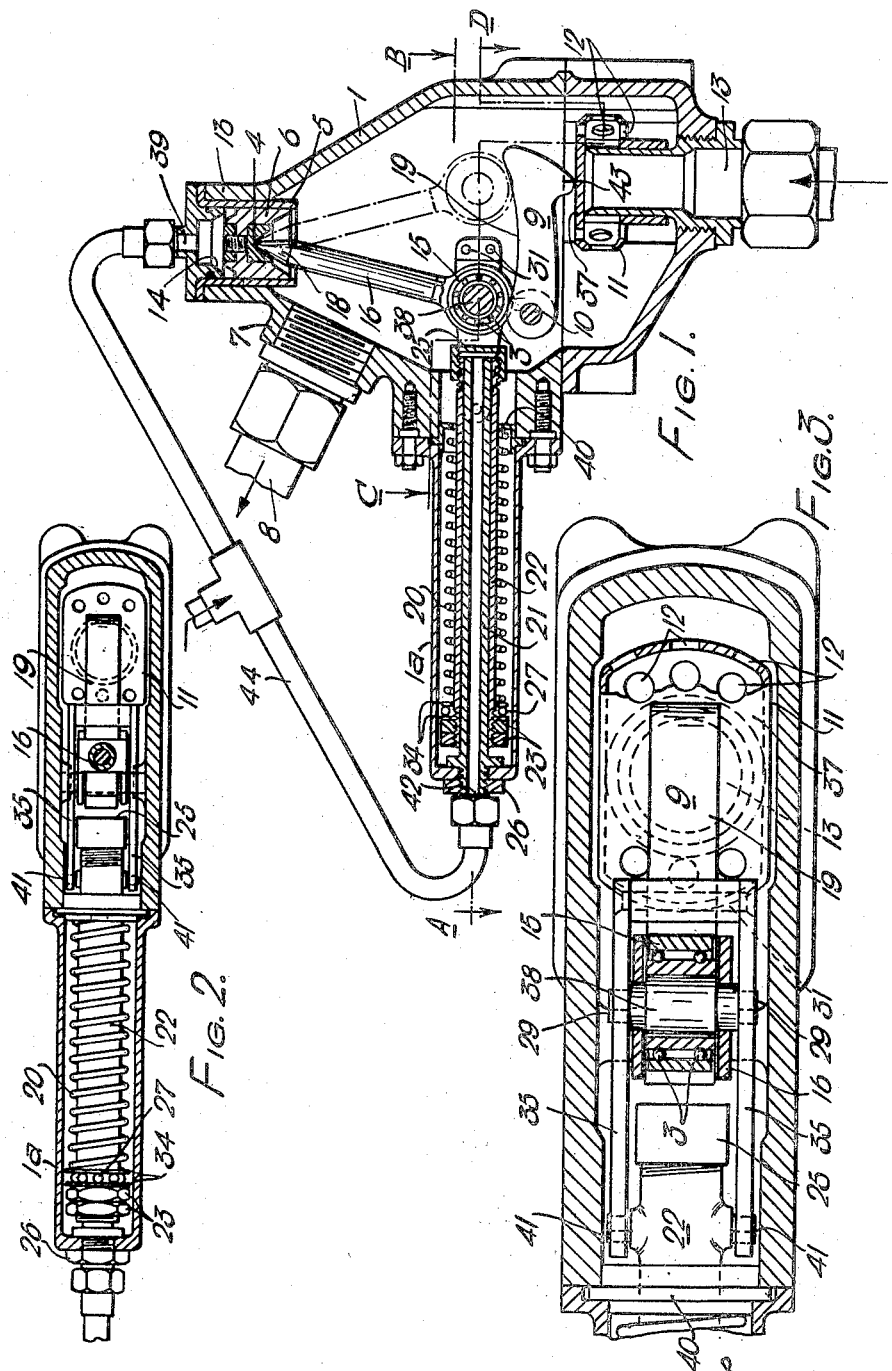

2,577,027

UNITED STATES PATENT OFFICE 2,577,027

APPARATUS FOR CONTROLLING ONE HYDRAULIC PRESSURE IN ACCORDANCE WITH ANOTHER

Roderick Cristall McLeod, Cropston, England, assignor to Power Jets (Research & Development) Limited, London, England Application October 30, 1945, Serial No. 625,568
In Great Britain February 10, 1944

9 Claims. (Cl. 137—53)

This invention relates to means whereby one hydraulic pressure is to be controlled in accordance with another; the word "hydraulic" is used in its wider sense including gaseous pressures. The immediate application of the invention is to a fuel system of a specialised sort, namely that of the thrust augmenter of a jet propulsion system for aircraft. In this application certain characteristics are required of the fuel control, and the invention, whilst meeting the particular requirement, will be seen to be capable of wider applications. Broadly the invention enables one hydraulic pressure to be controlled by another in accordance with the square of the second, or with modification, in other ratios or progressions. It can be foreseen that in many applications, especially where restrictive orifices with quadratic characteristics are involved, it may be desirable to be able to control hydraulic pressure in corresponding manner.

The particular application of the invention, a statement of which will aid its clarification, is as follows. A propulsion system for aircraft comprises a prime mover consisting of a gas turbine driving a compressor in the output of which fuel is burned, the so-energised combustion products driving the turbine and then constituting a jet propulsion stream. To augment the thrust thus afforded, a second turbine is driven by this stream, and in turn drives a compressor or ducted fan which entrains new air and contributes it to the final propulsive stream. In this new air, fuel (called secondary fuel) may be burned, still further augmenting the total thrust. The invention is concerned with the supply control of this secondary fuel, especially in the light of the combustion problem which, as investigated experimentally, is a somewhat specialised one. In order to secure efficient combustion in such a secondary stream without undue loss of air pressure (such pressure loss having a very pronounced effect on thrust delivered) it is found desirable to use burner means which, for practical reasons such as simplicity and weight, are in technical effect simple orifices and thus have a pressure/flow characteristic substantially following a quadratic law. It is, moreover, desirable to interrelate the secondary fuel supply pressure with the pressure of supply of fuel to the prime mover, because thus any altitude compensation means provided for the prime mover, suffice also for the augmenter system (and other advantages of simplicity etc. are also afforded).

Thus the requirement emerges of controlling the supply pressure of the secondary fuel in accordance with the square of the pressure of the prime-mover fuel.

The invention provides apparatus which will fulfill this requirement. Thus, according to the invention a piston or the like subject to the pressure of one fluid acts on a lever which in turn applies load to a valve controlling the pressure of a second fluid, and a second piston subject also to the pressure of the first of the said fluids acts to vary the leverage ratio of the said lever as the pressure of the said first fluid varies. It will be clear that the effect of the first piston alone would be to vary the pressure of the second fluid proportionally to that of the first. Clearly also the additional effect of the second piston is to vary the leverage ratio, so that if, for example, the variation is proportional to the pressure of the first of the said fluids, the resultant effect will be that the load applied by the lever will vary, in accordance with the square of the pressure of the second fluid. Various other desired relationships could however be obtained.

One form of embodiment of the apparatus according to the invention will be described by way of example with reference to the accompanying drawings in which:

Fig. 1 is a vertical section of said embodiment;

Fig. 2 is a plan view in part section along the line A—B of Fig. 1 and

Fig. 3 is an enlarged section along the line C—D of Fig. 1.

Referring to the drawings, the fluid whose pressure is to be controlled is contained in a casing I and enters the apparatus by means of inlet 13. The pressure of this fluid can be adjusted by a relief valve 11 which is closable against the lower surface of the valve head 37 and is provided with relief ports 12 through which the fluid to be controlled can flow to the fluid outlet 8 provided in the boss 7.

The position of the valve head 37 can be adjusted by its abutment against the nose 43 of a link lever 9 which is pivoted at a fulcrum 10 and on the upper surface 19 of which can roll a roller 15 mounted at one end of a rod 16 so that the said rod can pivot about the extreme tip of its conical head 18 which bears pivotally against a conical centre 4 provided in a piston 6.

The roller 15 can rotate about its pivot 38 by means of ball bearings 3.

The piston 6 is slidably mounted within a liner 5 rigidly secured in a tubular extension 1b of the casing I, said extension being provided with an inlet 39 of which the inner surface 14 is adapted to act as a seat for piston 6. Inlet 39 acts as an entry for the fluid exerting the controlling pressure which is consequently transmitted to the piston 6.

The casing 1 also comprises another extended tubular portion 1a in which is held stationary a sleeve 21 which communicates with another inlet 42 for the fluid exerting the controlling pressure and over which can move a slidable hollow cylindrical piston 22. A spring 20 bears at one end against an abutment 40 rigid with the casing 1 and at its other end the said spring 20 bears against thrust washers 34 and ball bearings 27 the object of which is to prevent the spring 20 from twisting when it is compressed. The assembly of spring 20, piston 22 and sleeve 21 is held together by means of lock nuts 23 and an external lock nut 26. One end of the piston 22 is closed by a cap nut 25 adapted to engage on a suitably threaded part of said piston.

As seen more particularly in Fig. 3, the piston 22 is connected to links 35 by means of pins 41 and is movable together with the links 35 by means of trunnions 29 mounted on the pivot 38. The ends of the links 35 are secured together by means of rivets 31.

The inlets 39 and 42 for the controlling fluid are connected hydraulically in parallel, for example by means of a suitable pipe 44 and the mode of operation of the apparatus is as follows:

The controlling pressure is exerted through the inlet 39 on to the piston 6 which pressure is transmitted through the member 16 and the link lever 9 to the valve head 37.

The mechanical advantage of this lever linkage is varied by the operation of the controlling pressure which is exerted also through the inlet 42 by fluid which enters sleeve 21 and exerts a thrust against the internal surface of the nut 25. When this thrust exceeds the force exerted by spring 20 which acts so as to tend to prevent the piston 22 from moving to the right as shown in Fig. 1, the piston 22 is moved to the right causing the links 35 to move by means of the trunnions 29 and thereby moving the roller 15 over the surface 19 of the link lever 9. The effect of the movement of roller 15 is to alter the leverage exerted on the valve head 37 by the controlling pressure acting through inlet 39 and thus to alter the mechanical advantage of the adjusting mechanism.

By suitably adjusting the areas of the head of piston 6 and valve head 37 and the lengths of the various members of the lever linkage between piston 6 and valve head 37, the variation in the pressure to be controlled can be arranged to have any desired relationship with the controlling pressure. Thus it will be seen that the leverage ratio through which the piston 6 applies pressure proportionally to the fluid pressure thereon to the valve head 37 can readily be made to vary proportionally to the fluid pressure so that the load applied to the valve head 37 will vary as the square of that pressure.

Although in this particular example the path of the roller 15 is an arc 19 of a circle of which the centre is the tip of the conical head 18, this path may be modified in particular cases. Moreover, elaborations may be introduced to produce various required functional characteristics of the device. For example, the line of action of the piston 22 relative to the member 16 may be varied to give various effects. The second piston 22 may shift the fulcrum 10 instead of the rod 16 in cases where this may be preferable for mechanical or design reasons.

The valve 11 may if desired be replaced by a variable delivery pump or other suitable means deemed to involve the movement of a part such as a valve, the abutment of a spring or an equivalent. In this specification the term "valve" is intended to include all such means. The term "piston" is also intended to include all equivalent means.

I claim:

1. Apparatus for controlling one hydraulic pressure in accordance with another comprising a valve controlling the pressure to be controlled, a pivotally mounted lever adapted to adjust said valve, a member pivotally connected to a piston subject to the controlling pressure and adapted to exert a turning moment on said lever about the pivot of said lever, and a second piston subject to the controlling pressure and adapted to vary the said turning moment.

2. Apparatus according to claim 1 wherein the second piston is adapted to rotate said member about its pivot.

3. Apparatus according to claim 1 wherein the said member is adapted to movably bear against the said lever.

4. Apparatus according to claim 1 wherein the second piston is adapted to rotate said member about its pivot and wherein the said member is adapted to movably bear against the said lever.

5. Apparatus according to claim 1 wherein the second piston is adapted to move the pivot of the said lever.

6. Apparatus according to claim 1 wherein pivotally attached to and extending laterally of the general direction of said member is a side member connected to the second piston.

7. Apparatus according to claim 1 wherein the second piston is adapted to rotate said member about its pivot and wherein pivotally attached to and extending laterally of the general direction of said member is a side member connected to the second piston.

8. Apparatus according to claim 1 wherein the said member is adapted to movably bear against the said lever and wherein pivotally attached to and extending laterally of the general direction of said member is a side member connected to the second piston.

9. Apparatus for controlling pressure of a fluid in accordance with a controlling pressure comprising a valve controlling the said fluid, a lever located to bear on and load said valve, the pressure of said fluid being accordingly determined by the load thus applied to the valve, a piston subject to the controlling pressure, connected to said lever to exert a turning moment thereon, and a second piston also subject to the controlling pressure and adapted to vary the said turning moment.

RODERICK CRISTALL McLEOD.

REFERENCES CITED

The following references are of record in the file of this patent:

UNITED STATES PATENTS

| Number | Name | Date |
| --- | --- | --- |
| 1,798,932 | Dreiske | Mar. 31, 1931 |
| 2,396,911 | Anxionnaz | Mar. 19, 1946 |